(12) United States Patent
Lowe-Wylde

(10) Patent No.: US 7,794,205 B1
(45) Date of Patent: Sep. 14, 2010

(54) VERTICAL AXIS WIND TURBINE BEARING AXIAL LOAD SHARING

(75) Inventor: Gregory J. T. Lowe-Wylde, Oshawa (CA)

(73) Assignee: Robert A. Vanderhye, McLean, VA (US)

( * ) Notice: Subject to any disclaimer, the term of this patent is extended or adjusted under 35 U.S.C. 154(b) by 877 days.

(21) Appl. No.: 11/707,906

(22) Filed: Feb. 20, 2007

Related U.S. Application Data

(60) Provisional application No. 60/781,342, filed on Mar. 13, 2006.

(51) Int. Cl.
*F03D 3/00* (2006.01)

(52) U.S. Cl. .................. 416/1; 416/144; 416/197 A; 415/4.2; 415/905

(58) Field of Classification Search .......... 416/1, 416/128, 144, 197 A, DIG. 9; 415/4.2, 905
See application file for complete search history.

(56) References Cited

U.S. PATENT DOCUMENTS

| | | | | |
|---|---|---|---|---|
| 1,100,332 A | * | 6/1914 | Smith | 416/175 |
| 1,697,574 A | | 1/1929 | Savonius | |
| 4,281,965 A | * | 8/1981 | Stjernholm | 416/227 A |
| 4,342,539 A | | 8/1982 | Potter | |
| 4,362,470 A | * | 12/1982 | Locastro et al. | 416/197 A |
| 4,668,109 A | * | 5/1987 | Basso | 384/518 |
| 4,749,335 A | * | 6/1988 | Brandt et al. | 416/157 R |
| 4,889,195 A | | 12/1989 | Kruger et al. | |
| 5,171,127 A | | 12/1992 | Feldman et al. | |
| 5,877,433 A | | 3/1999 | Matsuzaki et al. | |
| 6,108,986 A | | 8/2000 | Hiramoto et al. | |
| 6,808,366 B2 | * | 10/2004 | Sikes | 416/1 |
| 7,029,244 B2 | | 4/2006 | Anderson | |
| 2005/0201861 A1 | * | 9/2005 | Yoshida et al. | 415/206 |
| 2007/0065064 A1 | * | 3/2007 | Kitamura et al. | 384/537 |

* cited by examiner

*Primary Examiner*—Igor Kershteyn

(57) ABSTRACT

A vertical axis wind turbine (VAWT) assembly effects sharing of the axial load on its bearings to increase equipment life and/or effective operation. The assembly includes: a support; a VAWT (e.g. Savonius) having a substantially vertical shaft; at least lower and upper substantially vertically spaced bearings mounting the shaft for rotation about a substantially vertical axis, the bearings operatively mounted by the support; and a load-sharing assembly connected to the upper bearing which allows the bearings to share at least 10% (such as 50-50) of the axial load. The load sharing assembly may include a spring surrounding an upper portion of the shaft, and operatively engaging the upper bearing. The shaft may include an upper shall extension, and the load sharing assembly a spring end cap operatively connected to the upper shaft extension and holding the spring against the upper bearing.

20 Claims, 1 Drawing Sheet ced Savonius with optimum blade curvature), operatively connected to a utilization device. The support also may have many different configurations, such as a three legged frame having support arms extending radially inwardly from the frame legs and supporting the first and second bearings. While more than two bearings may be provided, the bearings may consist essentially of only the first and second bearings.

VERTICAL AXIS WIND TURBINE BEARING AXIAL LOAD SHARING

CROSS-REFERENCE TO RELATED APPLICATIONS

This application claims the benefit of, and incorporates by reference, provisional application Ser. No. 60/781,342 field Mar. 13, 2006, which in turn incorporates by reference provisional application Ser. No. 60/756,233 filed Jan. 5, 2006. Co-pending U.S. utility application Ser. Nos. 11/265,278 filed Nov. 3, 2005 and 11/251,773 filed Oct. 18, 2005, are hereby also incorporated by reference herein.

BACKGROUND AND SUMMARY OF THE INVENTION

In the practical use of a vertical axis wind turbine (VAWT) it is highly desirable to have at least first and second substantially vertically spaced bearings. Typically the bearings are radial ball bearings, although others may be utilized. Normally, during use, almost the entire weight of the VAWT is supported by the lowest (i.e. first) bearing. While most bearings, particularly radial ball bearings, can tolerate large radial loads, they do not tolerate axial loading as well, and therefore can wear more quickly than desired during use, causing undesirable downtime of the VAWT, or less than efficient operation.

According to the invention, the problem described above is minimized by providing axial load sharing between at least the first and second (e.g. lower and upper) bearings so that the first bearing does not wear out as quickly. While the load sharing may be anywhere between about 10-90%, ideally the construction is designed so that the load sharing between the first and second bearings (where only two bearings are provided) is roughly about 50-50 so that the bearings wear out at approximately the same time.

While the invention is particularly applicable to VAWTs, under some circumstances the concepts of the invention may be applied to other structures having substantially vertically spaced first and second bearings mounting a shaft for rotation or reciprocation.

In particular, according to one aspect of the present invention there is provided a vertical axis wind turbine assembly comprising: A support. A vertical axis wind turbine having a substantially vertical shaft. At least first, lower, and second, upper, substantially vertically spaced bearings for mounting the shaft for rotation about a substantially vertical axis, the bearings operatively mounted by the support. And a load-sharing assembly operatively connected to the second bearing which allows the bearings to share at least about 10% of the axial load on the bearings. The bearings may be radial ball bearings, or of other conventional types.

Desirably, the load sharing assembly comprises at least one spring (such as a coil or conical spring, although other types are suitable) surrounding an upper portion of the shaft, and operatively engaging the second bearing. Typically, the shaft includes an upper shaft extension, and the load sharing assembly further comprises a spring end cap operatively connected to the upper shaft extension and holding the spring against the second bearing. The spring may consist essentially of a single coil spring, and the spring constant of the spring may be selected with respect to the total axial loading of the bearings so that the bearing load sharing will be roughly about 50-50.

Although a wide variety of different types of VAWTs may be utilized, the vertical axis wind turbine preferably comprises a Savonius wind turbine (e.g. a three bladed Savonius with optimum blade curvature), operatively connected to a utilization device. The support also may have many different configurations, such as a three legged frame having support arms extending radially inwardly from the frame legs and supporting the first and second bearings. While more than two bearings may be provided, the bearings may consist essentially of only the first and second bearings.

According to another aspect of the present invention there is provided a method of operating a vertical axis wind turbine having substantially vertically spaced at least upper and lower bearings by (a) distributing the axial loading between the bearings of the wind turbine so that each of the upper and lower-bearings support at least about 10% (e.g. between about 30-70%) of the total axial load. In the utilization of the method, (a) may be practiced by selecting the spring constant or constants of at least one spring operatively acting on the upper bearing with respect to the total axial load including the weight of the wind turbine.

Since the bearings will wear roughly evenly, the method may further comprise (b) replacing both the upper and lower bearings of the VAWT (especially where it is a Savonius, such as a three-bladed Savonius with optimum blade curvature) at the same time after extended operation thereof. Also, the method may further comprise (c) adjusting the spring constant of, or replacing, the spring without an extended hiatus of operation of the VAWT so as to change the relative load sharing of the bearings depending upon which one is wearing more quickly during operation.

According to still another aspect of the invention, there is provided an assembly comprising: A support. An operable device (not necessarily a VAWT, but any suitable such device) having a substantially vertical shaft. At least first, lower, and second, upper, substantially vertically spaced bearings for mounting the shaft for rotation or reciprocation, the bearings operatively mounted by the support. And a load-sharing assembly operatively connected to the second bearing which allows the bearings to share at least about 10% of the axial load on the bearings. Desirably, the load sharing assembly comprises at least one spring operatively acting on the upper bearing, the spring constant or constants of which is or are selected so that the upper and lower bearings each share about 40%-60% of the total axial load on the bearings. The at least one spring may consist essentially of a single coil or conical spring.

It is the primary object of the present invention to mount a VAWT, or like structure, with at least upper and lower bearings whereby the wear of the bearings is more even than in typical such structures. This and other objects of the invention will become clear from a detailed description of the invention, and from the appended claims.

DETAILED DESCRIPTION OF THE DRAWING

Figure 1:
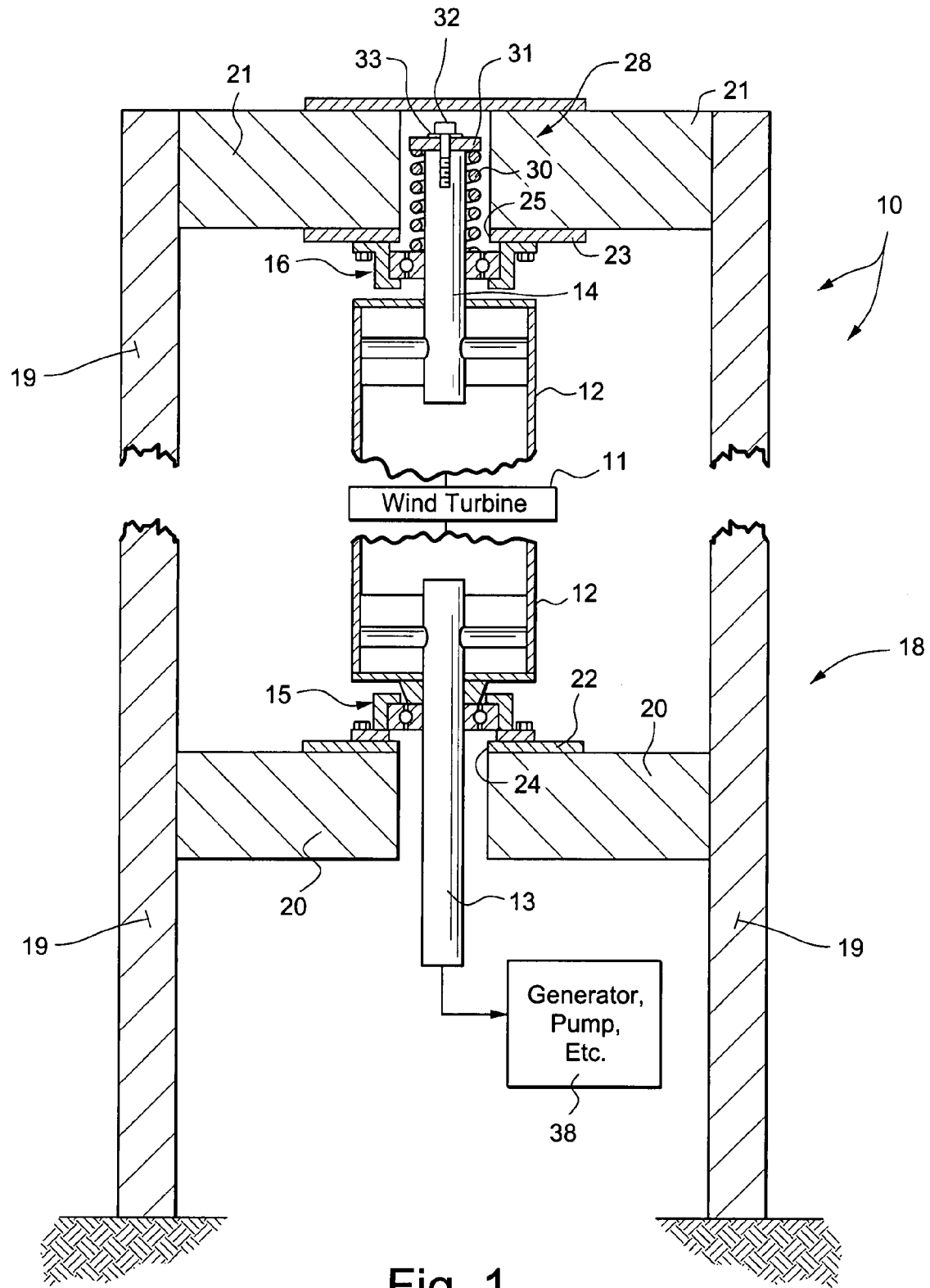
FIG. 1 is a schematic side view, partly in cross-section and partly in elevation, of an exemplary VAWT according to the invention.

FIG. 1 is a schematic side view, partly in cross-section and partly in elevation, of an exemplary VAWT assembly 10 according to the invention. The assembly 10 is shown cut away so that its height is not illustrated. However, the assembly may have essentially any practical height (e.g. about 40 feet if the turbine 11 itself is about 28 feet high).

The VAWT itself is shown schematically only by box 11 in FIG. 1, and includes a substantially vertical shaft 12, the upper and lower portions of which are shown in cross-section in FIG. 1. The wind turbine 11 preferably is a three bladed Savonius with optimum blade curvature, such as shown and described in the Ser. Nos. 11/265,278, 11/251,773, and 60/756,233 applications, but it may be any suitable conventional or hereafter developed type of turbine, including (but not limited to) other types of Savonius (including conventional two bladed) turbines, Darrieus, hybrids (e.g. of Darrieus and Savonius), a two or four bladed either open or closed helical turbine such as shown in U.S. Pat. Nos. 2,677,344 or 6,428,275, the turbines shown at www.windside.com; or turbines from the following additional sources: "Wind Energy Systems", by Dr. Gary L. Johnson, Nov. 20, 2001, Chapter 1, pages 1-16 through 1-18; U.S. Pat. Nos. 1,697,574, 4,359, 311, 4,500,259, 4,624,624, 4,830,570, 6,293,835 and 6,966, 747; Popular Science July, 1933 "New Rotor Ship Sails In Lightest Wind"; Japanese patent publication 9287549 published 1997-11-04; and "Modified Savonius Rotor" at www-.pandragon.com.

In the embodiment illustrated in the drawing, the shaft 12 is substantially hollow, and extending downwardly and upwardly therefrom are shaft stubs, sections, extensions, or the like 13, 14, respectively. The extensions 13, 14—and thus the shaft 12 itself—are operatively received by a first (lower) bearing 15 and a second (upper) bearing 16, respectively. The bearings 15, 16 are operatively mounted by a frame or other support 18.

The frame 18 illustrated in FIG. 1 preferably has three legs 19, such as the three-legged frame disclosed in the Ser. Nos. 11/265,278 and 11/251,773 applications, the third leg of which is not visible in FIG. 1 since it has been removed for clarity of illustration. However, the frame or other support 18 may be any type of frame or support suitable for operatively mounting the bearings 15, 16 including two and four legged frames, supports such as shown in the Ser. No. 60/756,233 application or utility U.S. application Ser. No. 11/701,480 of Robert A. Vanderhye filed Feb. 2, 2007 entitled "VAWT Cluster And Individual Supporting Arrangements", or any other conventional or hereafter developed type.

The frame 18 actually illustrated in the drawing has generally radially extending arms 20, 21 which operatively engage the bearings 15, 16, respectively. The bearings 15, 16 may be operatively affixed to the arms 20, 21, respectively by plates 22, 23, respectively, having central openings 24, 25, respectively through which the shaft extensions 13, 14 pass.

In the preferred embodiment illustrated in the drawing, the bearings 15, 16 are conventional heavy duty radial ball bearings which can tolerate high radial loads, but do not tolerate axial (substantially vertical in this case) loads as well. However, any suitable type of conventional or hereafter developed bearings may be utilized. The bearings 15, 16 operatively mount the shaft 12 for rotation about a substantially vertical axis.

In the normal situation, the first, lower, bearing 15 supports substantially the entire axial load (which primarily comprises the weight of the wind turbine 11), while the second, upper, bearing 16 supports substantially none or very little. According to the invention this is avoided, and the axial load is shared by the bearings 15, 16, by providing a load-sharing assembly shown generally by reference numeral 28 in FIG. 1.

The exemplary load sharing assembly 28 illustrated in FIG. 1 comprises a coil (or conical) spring 30 which surrounds shaft extension 14, and a spring end cap 31 which preferably comprises a disk having a diameter greater than the outside diameter of the upper portion of spring 30. The bottom portion of the spring 30 operatively engages the bearing 16. The end cap 31 is operatively attached to the shaft extension 14 by the bolt or screw 32 threaded into the shaft extension 14, and a lock washer 33 between the head of the bolt 32 and the end cap 31 may be provided especially where the bolt 32 will be tightened down.

In FIG. 1 the extension 14 is cut away to illustrate the shaft of bolt 32 engaging interior threads of the extension 14. If desired, the components may be constructed so that by changing how far the bolt 32 is tightened, the compression (and thus the spring constant of) the spring 30 may be changed.

By selecting the spring constant of the spring 30 with respect to the weight of the VAWT 11 (and whatever other axial loads there might be), one can adjust the amount of load sharing between the bearings 15, 16. Preferably the load sharing will be between about 10-90 to 90-10 (i.e. between 10-90%), but in most situations it is contemplated that the sharing will be roughly about 50-50 [e.g. each of the bearings support about 44-56% of the total axial load] so that the bearings 15, 16 wear at approximately the same rate. In this way after extended operation of the VAWT 11 when wear of the bearings 15, 16 has occurred, both the bearings 15, 16 can economically be replaced at the same time.

While the load-sharing assembly 28 has been illustrated in a form that is presently conceived to be the simplest and most practical, it should be understood that many other configurations may be utilized, as long as they allow significant sharing between or among two or more bearings. For example, instead of a single coil (or conical) spring 30, multiple coil (and/or conical) springs may be utilized, one or more blocks of elastomeric material, one or more leaf springs, one or more pneumatic springs, or a wide variety of other mechanisms. These devices (28) may be operatively attached to the shaft 12 by any suitable mechanism besides the end cap 31, including by projections, other types of caps, lost motion connections, small bearings, low friction material such as polytetrafluoroethylene, or the like.

Also, while only first and second bearings 15, 16 are shown (the assembly may consist essentially of only two bearings), it is to be understood that other bearings may also be provided intermediate the bearings 15, 16 and operatively connected to the shaft 12. The other bearings may be supported by arms intermediate the arms 20, 21 and may or may not share the axial load.

The shaft 12 is operatively connected to some type of utilization device. For example, as schematically illustrated in FIG. 1, the shaft extension 13 is operatively connected to device 38, which may comprise an electric generator (or alternator), pump, hydrogen generator, mixing propeller or blades, or any other suitable utilization device.

The invention also relates to a method of operating a VAWT having substantially vertically spaced at least upper and lower bearings by (a) distributing the axial loading between the bearings of the VAWT so that each of the upper and lower bearings support at least about 10% (e.g. about 30-70%) of the total axial load. The method may further comprise (b) replacing both the upper and lower bearings of the VAWT (e.g. Savonius) at the same time after extended operation thereof. Also, the method may comprise (c) adjusting the compression (and thus spring constant) of the spring 30 (or replacing the spring 30) without an extended hiatus of operation of the VAWT so as to change the relative load sharing of the bearings 15, 16 depending upon which one is wearing more quickly during operation.

While the invention is desirably practiced utilizing a VAWT, it can be utilized with other operable devices having a substantially vertical shaft, and at least lower and upper substantially vertically spaced bearings mounting the shaft for rotation or reciprocation.

By balancing the axial load on the bearings, the invention increases the operational life of the VAWT or the like, and/or the effectiveness of operation during its operational life before repair is necessary. In fact, by practicing the invention the VAWT may wear out before the bearings do.

The term "operatively" as used herein means, as it normally does, any and all types of connection, engagement, mounting, association, or the like which allow the components to function as designed. Also all narrow ranges within a broad range are specifically included herein (e.g. between about 10-90 and 90-10 means 15-85, 70-30, 58-42, and all other narrow ranges). The invention is to be interpreted as broadly as possible consistent with the following claims, and limited only by the prior art.

What is claimed is:

1. A vertical axis wind turbine assembly comprising: a support; a vertical axis wind turbine having a substantially vertical shaft; at least first, lower, and second, upper, substantially vertically spaced bearings mounting the shaft for rotation about a substantially vertical axis, the bearings operatively mounted by the support; and a load-sharing assembly operatively connected to the second bearing which allows the bearings to share at least about 10% of the axial load on the bearings.

2. An assembly as recited in claim 1 wherein the bearings are radial ball bearings.

3. An assembly as recited in claim 1 wherein the load sharing assembly comprises at least one coil or conical spring surrounding an upper portion of the shaft, and operatively engaging the second bearing.

4. An assembly as recited in claim 3 wherein the shaft includes an upper shaft extension, and wherein the load sharing assembly further comprises a spring end cap operatively connected to the upper shaft extension and holding the spring against the second bearing.

5. An assembly as recited in claim 1 wherein the vertical axis wind turbine comprises a Savonius wind turbine, operatively connected to a utilization device.

6. An assembly as recited in claim 1 wherein the support comprises a three legged frame having support arms extending radially inwardly from the frame legs and supporting the first and second bearings.

7. An assembly as recited in claim 1 wherein the load sharing assembly comprises at least one spring operatively connected to the shaft and operatively engaging the second bearing.

8. An assembly as recited in claim 7 wherein the spring consists essentially of a single coil or conical spring.

9. An assembly as recited in claim 8 wherein the spring constant of the spring is selected with respect to the total axial loading of the bearings so that the bearing load sharing will be roughly about 50-50.

10. An assembly as recited in claim 1 wherein the bearings consist essentially of only the first and second bearings.

11. An assembly as recited in claim 10 wherein the load sharing assembly comprises at least one spring operatively connected to the shaft and operatively engaging the second bearing.

12. An assembly as recited in claim 11 wherein said load sharing assembly comprises at least one spring operatively acting on the upper bearing, the spring constant or constants of which is or are selected so that the upper and lower bearings each share about 40%-60% of the total axial load on the bearings.

13. An assembly as recited in claim 11 wherein the vertical axis wind turbine comprises a Savonius wind turbine, operatively connected to a utilization device.

14. A method of operating a vertical axis wind turbine having substantially vertically spaced at least upper and lower bearings by (a) distributing the axial loading between the bearings of the wind turbine so that each of the upper and lower bearings support at least about 10% of the total axial load.

15. A method as recited in claim 14 wherein the vertical axis wind turbine comprises a Savonius, and further comprising (b) replacing both the upper and lower bearings of the Savonius at the same time after extended operation thereof.

16. A method as recited in claim 14 wherein (a) is practiced so that the upper and lower bearings each support between about 30%-70% of the total axial load, and wherein (a) is practiced by selecting the spring constant or constants of at least one spring operatively acting on the upper bearing with respect to the total axial load including the weight of the wind turbine.

17. A method as recited in claim 16 further comprising (c) adjusting the spring constant of, or replacing, the spring without an extended hiatus of operation of the VAWT so as to change the relative load sharing of the bearings depending upon which one is wearing more quickly during operation.

18. An assembly comprising: a support; an operable device having a substantially vertical shaft; at least first, lower, and second, upper, substantially vertically spaced bearings mounting the shaft for rotation or reciprocation, the bearings operatively mounted by the support; and a load-sharing assembly operatively connected to the second bearing which allows the bearings to share at least about 10% of the axial load on the bearings.

19. An assembly as recited in claim 18 wherein said load sharing assembly comprises at least one spring operatively acting on the upper bearing, the spring constant or constants of which is or are selected so that the upper and lower bearings each share about 40%-60% of the total axial load on the bearings.

20. An assembly as recited in claim 19 wherein said at least one spring consists essentially of a single coil or conical spring.

* * * * *